United States Patent
Johri et al.

(10) Patent No.: US 10,189,460 B2
(45) Date of Patent: Jan. 29, 2019

(54) METHODS AND SYSTEM FOR OPERATING A VEHICLE TRANSMISSION

(71) Applicant: Ford Global Technologies, LLC, Dearborn, MI (US)

(72) Inventors: Rajit Johri, Canton, MI (US); Wei Liang, Farmington Hills, MI (US); Mark Steven Yamazaki, Canton, MI (US); Xiaoyong Wang, Novi, MI (US); Jeffrey Allen Doering, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 14/621,142

(22) Filed: Feb. 12, 2015

(65) Prior Publication Data

US 2016/0236670 A1 Aug. 18, 2016

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 10/06* | (2006.01) | |
| *B60W 10/02* | (2006.01) | |
| *B60W 10/08* | (2006.01) | |
| *B60K 6/387* | (2007.10) | |
| *B60K 6/547* | (2007.10) | |

(Continued)

(52) U.S. Cl.
CPC ............ *B60W 10/06* (2013.01); *B60K 6/387* (2013.01); *B60K 6/547* (2013.01); *B60W 10/02* (2013.01); *B60W 10/023* (2013.01); *B60W 10/026* (2013.01); *B60W 10/08* (2013.01); *B60W 10/115* (2013.01); *B60W 20/13* (2016.01); *B60W 20/14* (2016.01); *B60W 30/18127* (2013.01); *B60K 2006/4825* (2013.01); *B60W 2510/0266* (2013.01); *B60W 2510/088* (2013.01); *B60W 2510/244* (2013.01); *B60W 2540/10* (2013.01); *B60W 2710/024* (2013.01); *B60W 2710/028* (2013.01); *B60W 2710/0644* (2013.01); *B60W 2710/083* (2013.01); *B60W 2710/1011* (2013.01); *Y02T 10/6252* (2013.01); *Y02T 10/6286* (2013.01); *Y10S 903/93* (2013.01)

(58) Field of Classification Search
CPC .... B60W 20/106; B60W 10/10; B60W 20/00; F16H 41/04; B60K 6/20; B60K 31/047; F02D 41/023
USPC .................... 701/22, 58, 54, 115; 477/86, 5; 180/65.25; 123/350, 352
See application file for complete search history.

(56) References Cited

U.S. PATENT DOCUMENTS 5,978,729 A * 11/1999 Landes ................ B60K 31/047
123/352
6,616,569 B2 9/2003 Hoang et al.
(Continued)

*Primary Examiner* — Mahmoud S Ismail
(74) *Attorney, Agent, or Firm* — David Kelley; McCoy Russell LLP

(57) ABSTRACT

Systems and methods for operating a hybrid vehicle driveline that includes an engine and a motor are presented. In one example, the systems and methods include one or more speed control modes where torque output of a motor is adjusted responsive to different control parameters in the different control modes.

15 Claims, 5 Drawing Sheets

(51) Int. Cl.
  *B60W 10/115* (2012.01)
  *B60W 30/18* (2012.01)
  *B60W 20/13* (2016.01)
  *B60W 20/14* (2016.01)
  *G06F 19/00* (2018.01)
  *G06G 7/70* (2006.01)
  *F02D 41/00* (2006.01)
  *F02D 31/00* (2006.01)
  *B60K 6/48* (2007.10)

(56) References Cited

U.S. PATENT DOCUMENTS

| | | |
|---|---|---|
| 6,991,053 B2 | 1/2006 | Kuang et al. |
| 7,815,026 B2 | 10/2010 | Povirk et al. |
| 8,326,475 B2 | 12/2012 | Yoshida et al. |
| 8,596,390 B2 | 12/2013 | Soliman et al. |
| 2008/0215216 A1* | 9/2008 | Janssen ............... F02D 41/0215 701/54 |
| 2009/0288895 A1* | 11/2009 | Klemen ................. B60K 6/365 180/65.25 |
| 2011/0010063 A1* | 1/2011 | Ota ........................ B60K 6/365 701/58 |
| 2011/0098152 A1* | 4/2011 | Sah ........................ B60K 6/365 477/86 |
| 2013/0239584 A1 | 9/2013 | Suciu et al. |
| 2013/0291830 A1* | 11/2013 | Doering ................ F02D 41/023 123/350 |
| 2013/0296121 A1* | 11/2013 | Gibson ................. F02D 41/022 477/5 |
| 2014/0162838 A1 | 6/2014 | Doering et al. |

\* cited by examiner

METHODS AND SYSTEM FOR OPERATING A VEHICLE TRANSMISSION

FIELD

The present description relates to methods and a system for controlling operation of a hybrid vehicle's driveline. The methods and systems may be particularly useful for hybrid vehicles that include a battery that may charge and discharge during vehicle operation.

BACKGROUND AND SUMMARY

A driveline of a vehicle may operate in a speed control mode from time to time when driver demand torque is at a low level. By operating in a speed control mode, the driveline may avoid operating at conditions where it may be difficult to control driveline torque or conditions where driveline noise and vibration may be greater than is desired. A hybrid vehicle may operate with an internal combustion engine and an electric motor while in a driveline speed control mode. Because the electric motor has a higher torque bandwidth than the engine, it may be operated in the driveline speed control mode to smooth driveline torque pulsations that may be related to cylinder firing events in the internal combustion engine. However, there may be select operating conditions where it may be more difficult to maintain a desired driveline speed in the driveline speed control mode even with the motor's higher torque bandwidth.

The inventors herein have recognized the above-mentioned issue and have developed a driveline operating method, comprising: reducing a torque output range of authority of a motor to a non-zero value in a driveline operating in a speed control mode in response to a battery state of charge exceeding a threshold level.

By reducing a torque output range of authority of the motor to a non-zero value, it may be possible to provide the technical result of improved driveline speed control even during conditions where a high state of battery charge precludes battery charging via the motor. For example, when battery state of charge is not at a high state, the motor may operate within its full range of torque (e.g., from maximum positive motor torque to maximum negative motor torque at the present motor speed) to maintain driveline speed at a desired driveline speed. However, if the battery state of charge is at a higher state of charge, motor torque may be limited to a range less than the full range of torque so that driveline speed control may be improved even when the battery may accept lower rate of charging. In one example, the motor torque may be limited based on driveline disconnect clutch inertia and motor inertia. The driveline inertia may be effectively electronically reduced so that actions taken by an engine speed controller may improve driveline speed control.

The present description may provide several advantages. For example, the approach may provide improve driveline speed control, especially when a vehicle battery is at a high state of charge. Additionally, the approach may be applied during varying operating conditions where the desired driveline speed may not be constant. Further, the approach may improve battery life by reducing the battery rate of charge when the battery is operating at a higher state of charge.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
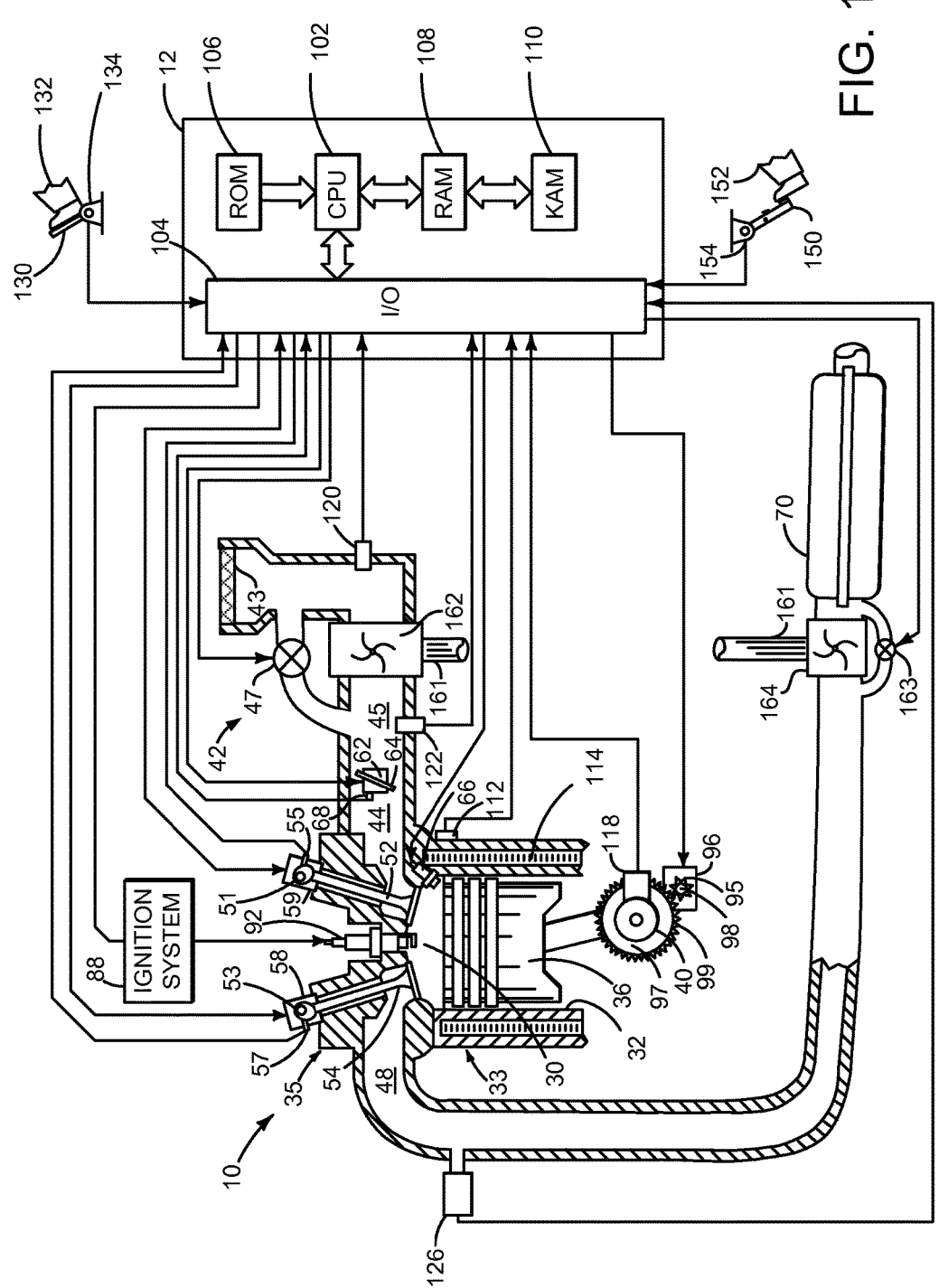
FIG. 1 is a schematic diagram of an engine.
Figure 2:
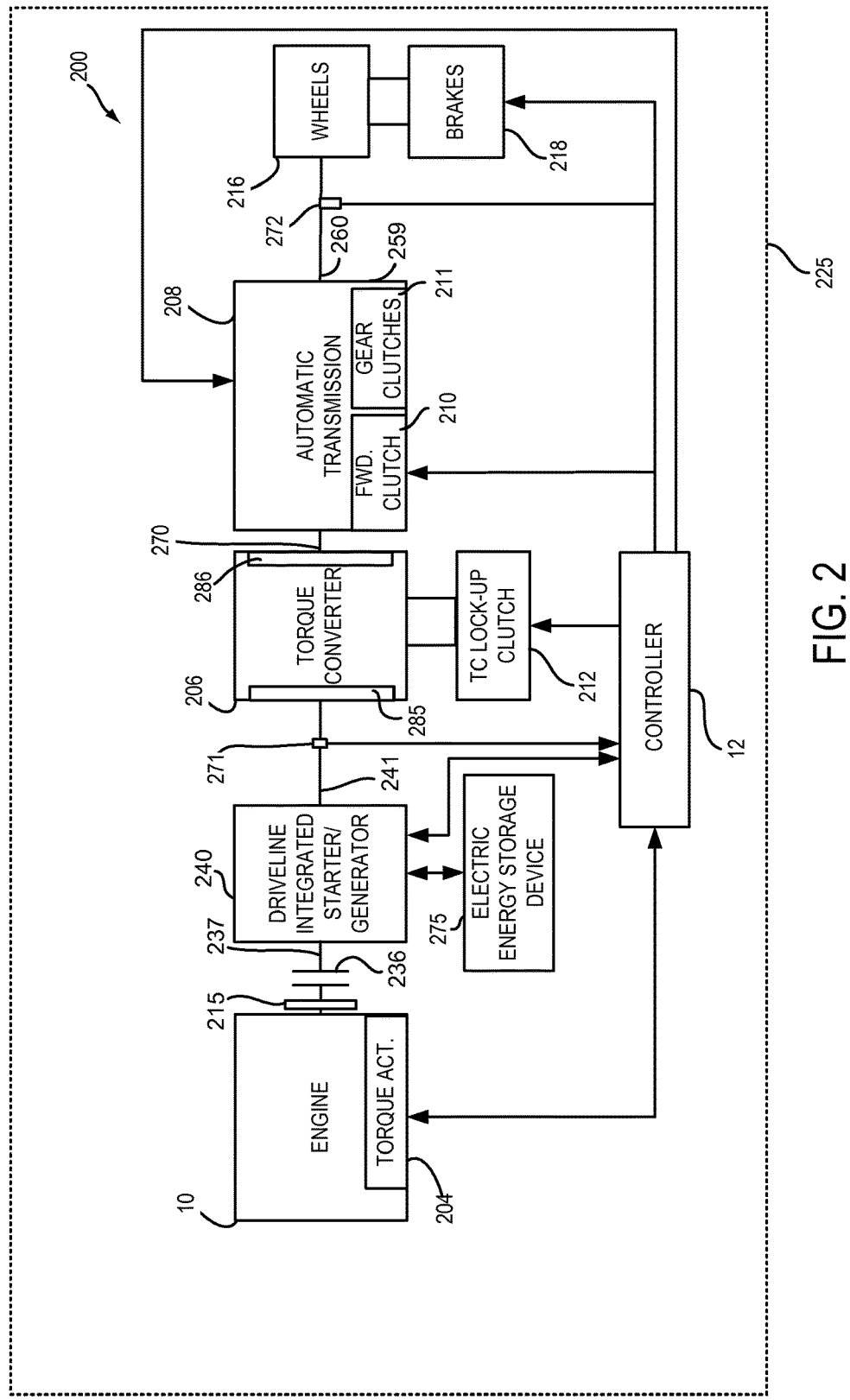
FIG. 2 is a schematic diagram of a hybrid vehicle driveline.
Figure 3:
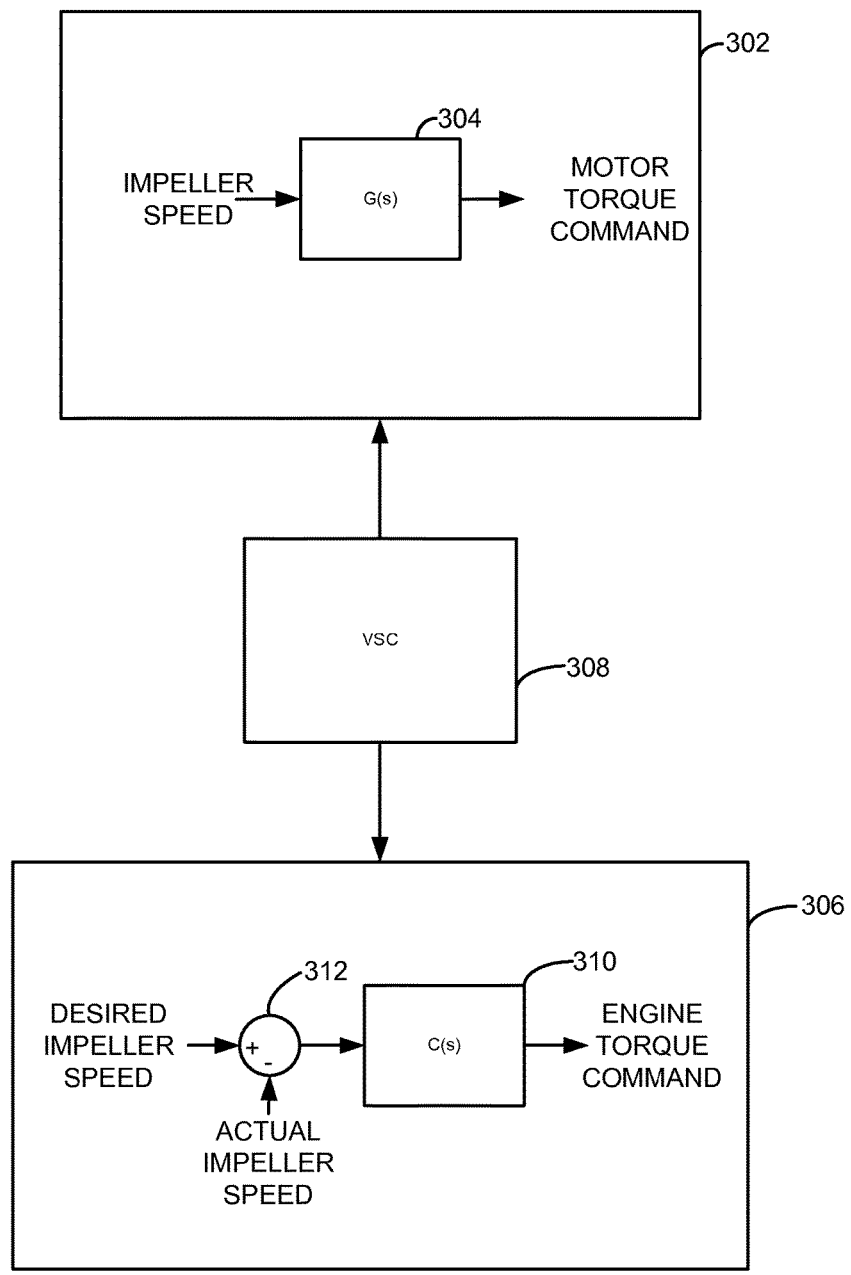
FIG. 3 is a block diagram of a hybrid vehicle control system.
Figure 4:
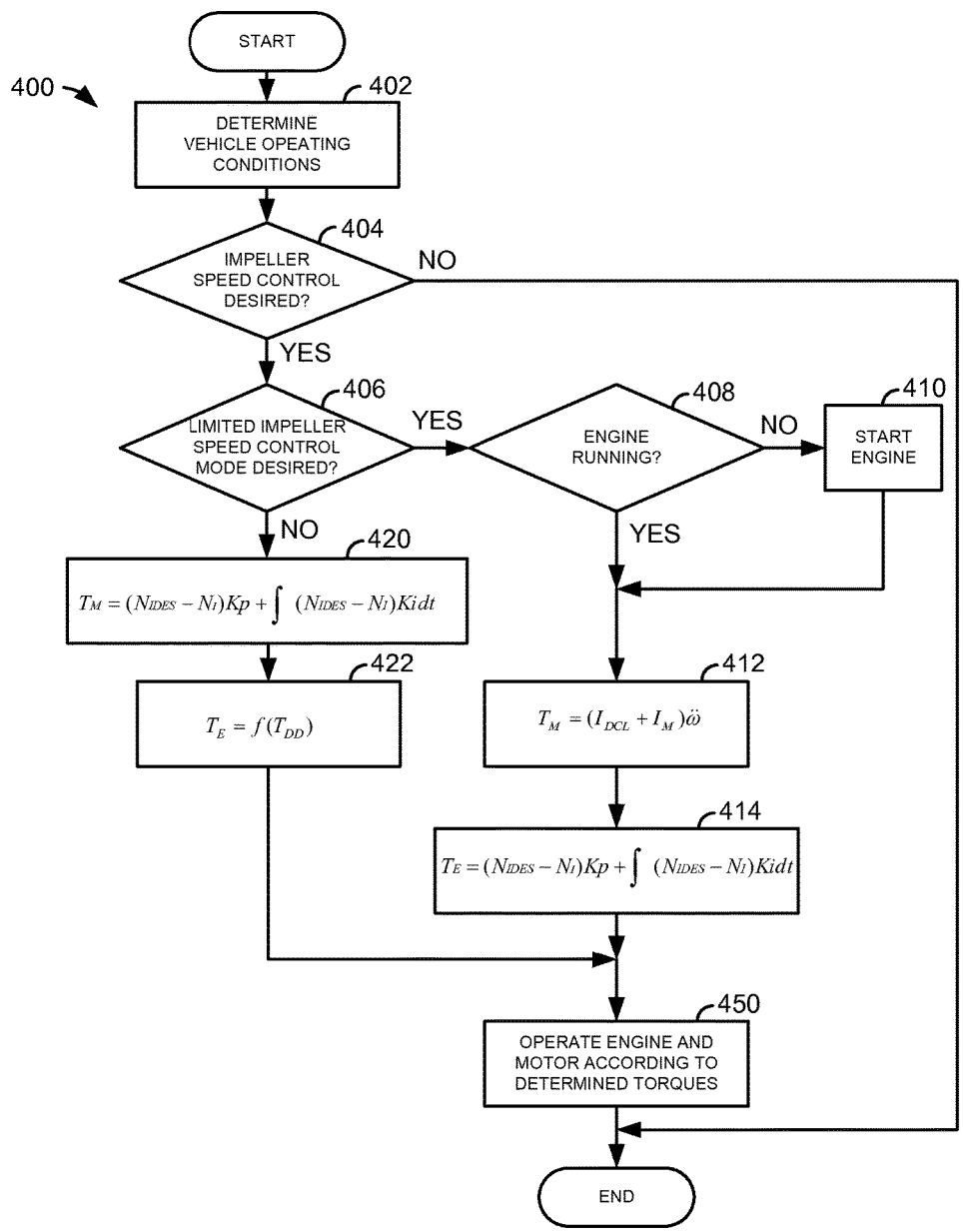
FIG. 4 is a method for operating the hybrid driveline.
Figure 5:
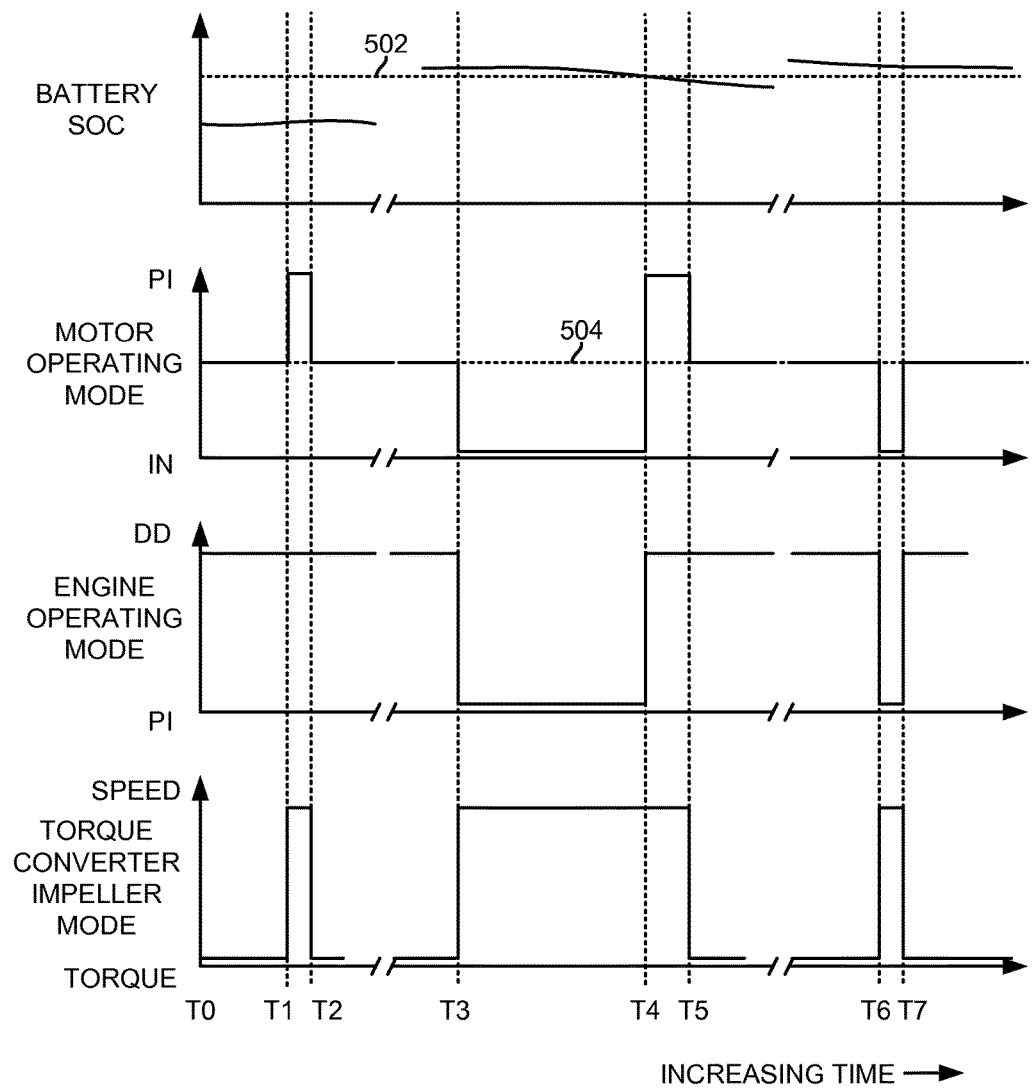
FIG. 5 is an example driveline operating sequence.

The present description is related to controlling a driveline of a hybrid vehicle operating in a speed control mode. The hybrid vehicle may include an engine as is shown in FIG. 1. The engine of FIG. 1 may be included in a powertrain or driveline as is shown in FIG. 2. The vehicle system of FIGS. 1 and 2 may include a control system as is shown in FIG. 3. FIG. 4 shows a method for operating the hybrid driveline in one of two speed control modes. Finally, FIG. 5 shows an example driveline operating sequence where a hybrid vehicle driveline is operated in two different speed control modes.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. Hydraulic conduits or lines are shown by dotted lines. Electrical and mechanical connections are shown via solid lines.

The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. DISG may provide torque to wheels 216 while engine 10 is operating or stopped rotating.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 receives DISG position via position sensor 271. Controller 12 may convert transmission input shaft position into input shaft speed via differentiating a signal from position sensor 271. Controller 12 may receive transmission output shaft torque from torque sensor 272. Alternatively, sensor 272 may be a position sensor, or torque and position sensors. If sensor 272 is a position sensor, controller 12 differentiates a position signal to determine transmission output shaft velocity. Controller 12 may also differentiate transmission output shaft velocity to determine transmission output shaft acceleration.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

The system of FIGS. 1 and 2 provides for a driveline, comprising: an engine; a motor; a battery electrically coupled to the motor; a disconnect clutch positioned in a driveline between the engine and the motor; a transmission coupled to the motor; and a controller including executable instructions stored in non-transitory memory for operating the driveline in a first driveline speed control mode and a second driveline speed control mode, and instructions for switching between the first driveline speed control mode and the second driveline speed control mode in response to charge of the battery exceeding a threshold charge. The driveline includes where in the first driveline speed control mode, torque of the motor in the driveline is adjusted responsive to torque converter impeller speed.

In some examples, the driveline includes where in the second driveline speed control mode, torque of the motor in the driveline is adjusted responsive to torque converter impeller angular acceleration, driveline disconnect clutch inertia, and motor inertia. The driveline includes where in the first driveline speed control mode, torque of the engine in the driveline is adjusted responsive to driver demand torque. The driveline includes where in the second driveline speed control mode, torque of the engine in the driveline is adjusted responsive to torque converter impeller speed. The driveline includes where the first driveline speed control mode or the second driveline speed control mode is invoked when the transmission is in park or neutral.

Referring now to FIG. 3, a control system block diagram for the system of FIGS. 1 and 2 where the motor is operated in a limited speed control mode is shown. Vehicle system control (VSC) unit 308, which may be controller 12 shown in FIGS. 1 and 2 in some examples, interprets driver requests. For example, the vehicle system controller may determine driver demand torque (e.g., desired wheel torque) based on a position of an accelerator pedal and vehicle speed. VSC 308 may also adjust desired wheel torque based on a position of a brake pedal. VSC 308 also determines positive or negative torque output from engine 10 and DISG 240 shown in FIG. 2 to meet driver demand torque and braking torque. VSC 308 sends speed and/or torque demands to motor controller 302 and engine controller 306, both of which may be within controller 12 shown in FIG. 2. Motor controller 302 includes a transfer function 304 which receives a desired torque converter impeller speed and outputs a desired motor torque. Engine controller 306 includes a transfer function 310 which receives a torque converter impeller speed error from summing junction 312 and outputs a desired engine torque.

Referring now to FIG. 4, a method for operating a driveline is shown. The method may be incorporated into the system of FIGS. 1 and 2 as executable instructions stored in non-transitory memory. Additionally, the method of FIG. 4 may provide the operating sequences of FIG. 5.

At 402, method 400 determines vehicle operating conditions. Vehicle operating conditions may include but are not limited to battery state of charge, driver demand torque, vehicle speed, engine operating state, motor operating state, ambient temperature, battery charging rate limits, battery temperature, and torque converter impeller speed. Method 400 proceeds to 404 after operating conditions are determined.

At 404, method 400 judges if torque converter impeller speed control is desired. Torque converter impeller speed control may be desirable when the vehicle is in a creep mode where the vehicle brake is not applied, driver demand torque is less than a threshold, and vehicle speed is less than a threshold. The vehicle and driveline may enter creep mode after the vehicle is stopped, the brake pedal is released, and the accelerator pedal is not depressed. Torque converter impeller speed control mode may also be desirable when driver demand is less than a threshold while vehicle speed is greater than a threshold. For example, torque converter impeller speed control may be desired when the accelerator pedal is not applied and the vehicle is decelerating. The driveline and vehicle may enter torque converter impeller speed control mode when the vehicle is stopped and the vehicle's transmission is in neutral or park. Additionally, the driveline may enter torque converter impeller speed control mode during other select conditions. If method 400 judges it is desirable to be in torque converter impeller speed control mode, the answer is yes and method 400 proceeds to 406. Otherwise, the answer is no and method 400 proceeds to exit.

At 406, method 400 determines if limited torque converter impeller speed control is desired. Limited torque converter impeller speed control may be desired when battery state of charge is greater than a threshold. Alternatively, or in addition, method 400 may judge that limited torque converter impeller speed control is desired if it is desirable for the battery to accept charge at less than a threshold rate of charge. If battery state of charge is greater than a first threshold, it may not be desirable for the battery to be charged at the maximum charge that may be output by the motor operating in a generator at the motor's present speed. Battery performance may be degraded if the battery is charged to a level greater than a second threshold, the second threshold greater than the first threshold. Further, it may be desirable to provide charge to the battery from the motor at a rate that is less than a threshold rate to reduce the possibility of battery degradation. If method 400 judges that it may be desirable to reduce an amount of charge provided to the battery and/or reduce the rate of battery charging to less than a threshold, the answer is yes and method 400 proceeds to 408. Otherwise, the answer is no and method 400 proceeds to 420.

At 420, method 400 determines an amount of torque the motor provides to the driveline. The amount of motor torque may be positive (e.g., adding torque to the driveline) or negative (e.g., absorbing driveline torque and charging the battery). The motor torque may be expressed as:

$$T_M = (N_{IDES} - N_I)Kp + \int (N_{IDES} - N_I)Ki\,dt$$

where $T_M$ is the motor torque, $N_{IDES}$ is desired torque converter impeller speed, $N_I$ is actual torque converter impeller speed, Kp is a proportional gain, and Ki is an integral gain. Thus, torque converter impeller speed error is applied to a proportional/integral controller to provide motor torque control in a torque converter impeller speed control mode where motor torque is not limited or constrained by battery state of charge. Method 400 proceeds to 422 after the motor torque is determined.

At 422, method 400 determines an amount of torque the engine provides to the driveline. The amount of engine torque may be expressed as:

$$T_E = f(T_{DD})$$

where $T_E$ is the engine torque and $T_{DD}$ is driver demand torque as determined from accelerator pedal position and vehicle speed. Engine torque may be proportional to driver demand torque or engine torque may be piecewise linear with respect to driver demand torque. Method 400 proceeds to 450 after the motor torque is determined.

At 450, method 400 commands the engine and motor to the determined desired torques. Engine torque may be adjusted via adjusting one or more of a throttle, fuel amount, spark timing, and cam timing. Motor torque may be adjusted via adjusting current supplied to the motor and operating the motor as a generator to provide negative torque to the driveline. Method 400 proceeds to exit after engine and motor torque are adjusted.

At 408, method 400 determines if the engine is running (e.g., rotating and combusting air and fuel mixtures). In one example, method 400 may judge that the engine is not running if engine speed is zero rotational speed. Further, method 400 may judge that the engine is running if the engine is being supplied fuel and generating a positive torque. If method 400 judges that the engine is running, the answer is yes and method 400 proceeds to 412. Otherwise, the answer is no and method 400 proceeds to 410.

At 410, method 400 starts the engine via a starter or via the DISG. The engine may be rotated at a desired speed before fuel is delivered to start the engine. The engine may be determined to start if engine speed is greater than a threshold. Method 400 proceeds to 412 after the engine is started.

At 412, method 400 determines an amount of torque the motor provides to the driveline. The amount of motor torque may be positive (e.g., adding torque to the driveline) or negative (e.g., absorbing driveline torque and charging the battery). The motor torque may be expressed as:

$$T_M = (I_{DCL} + I_M)\ddot{\omega}$$

where $T_M$ is the motor torque, $I_{DCL}$ is driveline disconnect clutch inertia, $I_M$ is motor inertia, and $\ddot{\omega}$ is torque converter impeller angular acceleration. Thus, the motor torque is the sum of driveline disconnect clutch and motor inertias multiplied by the angular acceleration of the torque converter impeller. Consequently, the motor torques in the two different torque converter speed control modes are different and based on different control parameters. Method 400 proceeds to 414 after the motor torque is determined.

At 414, method 400 determines an amount of torque the engine provides to the driveline. The amount of engine torque may be expressed as:

$$T_E = (N_{IDES} - N_I)Kp + \int (N_{IDES} - N_I)Ki\,dt$$

where $T_E$ is the engine torque, $N_{IDES}$ is desired torque converter impeller speed, $N_I$ is actual torque converter impeller speed, Kp is a proportional gain, and Ki is an integral gain. Thus, torque converter impeller speed error is applied to a proportional/integral to provide engine torque control in a torque converter impeller speed control mode where motor torque is limited or constrained by battery state of charge. Note that the Kp and Ki gain terms of 414 and 420 may be different values. Method 400 proceeds to 450 after the motor torque is determined.

Thus, the motor torque may be limited to a torque that is based on the driveline disconnect clutch inertia and the motor inertia in a torque converter impeller speed control mode where battery state of charge is higher than a threshold. On the other hand, motor torque may be within the motor's full capacity (e.g., maximum positive and negative torque at the motor's present speed) when the driveline is in a torque converter impeller speed control mode where battery state of charge is lower than the threshold. The motor will operate outputting positive torque more often than negative torque when the motor torque range is smaller while battery state of charge is greater than the threshold because of system losses such as parasitic driveline losses in the torque converter and transmission fluid pump. Consequently, the battery state of charge may be lowered so that the driveline may eventually operate with the motor's full torque range of authority.

Thus, the method of FIG. 4 provides for a driveline operating method, comprising: reducing a torque output range of authority of a motor to a non-zero value in a driveline operating in a torque converter impeller speed control mode in response to a battery state of charge exceeding a threshold level. By making the motor torque range of authority non-zero the motor may absorb and provide torque to the driveline. The method includes where the driveline operating in the torque converter impeller speed control mode includes an engine operating in a speed control mode, and where the motor is operating in a torque control mode while the driveline is operating in the torque converter impeller speed control mode. The method includes where the engine is operated in the speed control mode via adjusting engine torque to maintain a desired driveline speed, and where the motor is operated in the torque control mode where motor torque is maintained in the torque output range of authority and motor speed is not a basis for controlling the motor.

In some examples, the method includes where the torque range of authority is reduced from a range extending from a maximum positive motor torque to a maximum negative motor torque. The method also includes where the driveline is operated in the speed control mode when a transmission of the driveline is in neutral or park. The method includes where the torque output range of authority is based on driveline disconnect clutch inertia and motor inertia. The method includes where the torque output range of authority is further based on driveline angular acceleration.

The method of FIG. 4 also provides for a driveline operating method, comprising: operating a driveline in a first torque converter impeller speed control mode in response to a battery first state of charge; and operating the driveline in a second torque converter impeller speed control mode in response to a second battery state of charge. The method includes where in the first torque converter impeller speed control mode, torque of a motor in the driveline is adjusted responsive to torque converter impeller speed. The method includes where in the second torque converter impeller speed control mode, the torque of the motor is adjusted responsive to torque converter impeller angular acceleration, driveline disconnect inertia, and motor inertia. The method also includes where in the first torque converter impeller speed control mode, torque of an engine is adjusted responsive to a driver demand torque.

In some examples, the method includes where in the second torque converter impeller speed control mode, torque of the engine is adjusted responsive to torque converter impeller speed. The method further comprises starting an engine if the engine is stopped when the driveline enters the second torque converter impeller speed control mode. The method includes where the second battery state of charge is greater than the battery first state of charge.

Referring now to FIG. 5, a driveline operating sequence is shown. The driveline operating sequence of FIG. 5 may be provided via the system of FIGS. 1 and 2. The driveline operating sequence may also be provided based on the method of FIG. 4. The double slashes (e.g., / /) indicated along the horizontal plot axis represent time discontinuities. The amount of time between the double slashes may vary and the driveline may propel the vehicle during the time represented between the double slashes. Vertical markers T0-T7 represent times of interest in the sequence.

The first plot from the top of FIG. 5 is a plot of battery state of charge (SOC) versus time. The vertical axis represents battery state of charge and battery state of charge increases in the direction of the vertical axis arrow. The horizontal axis represents time and time increases from the left side of the plot to the right side of the plot. Horizontal line 502 represents a threshold SOC.

The second plot from the top of FIG. 5 is a plot of motor or DISG operating mode versus time. The vertical axis represents motor operating mode when the driveline is in a torque converter speed control mode. The driveline is not in a torque converter impeller speed control mode when the trace is at a middle level of the vertical axis. The motor torque is based on inertia (IN) when the trace is at a lower level. The motor may enter IN mode when the driveline is in torque converter impeller speed control and battery SOC is greater than a threshold SOC. The motor torque is based on proportional/integral control (PI) when the trace is at a higher level. The motor may enter PI mode when the driveline is in torque converter impeller speed control and battery SOC is less than the threshold SOC. The horizontal axis represents time and time increases from the left side of the plot to the right side of the plot. Horizontal line 504 represents a trace level when the driveline is not in torque converter impeller speed control mode.

The third from the top of FIG. 5 is a plot of engine operating mode versus time. The vertical axis represents engine operating mode when the driveline is in a torque converter speed control mode. The engine torque is based on driver demand based torque control (DD) when the trace is at the higher level. The engine may enter DD control mode when the driveline is in torque control mode or when the driveline is in torque converter impeller speed control and battery SOC is less than a threshold SOC. The engine torque is based on proportional/integral control (PI) when the driveline is in torque converter impeller speed control and battery SOC is greater than the threshold SOC. The horizontal axis represents time and time increases from the left side of the plot to the right side of the plot.

The fourth plot from the top of FIG. 5 is a plot of torque converter impeller or driveline mode versus time. The vertical axis represents torque converter impeller or driveline mode. The driveline is in torque converter impeller speed control mode (e.g., torque converter impeller torque is allowed to vary and torque converter impeller speed is maintained at a desired speed) when the trace is at the higher level. The driveline or torque converter impeller is in torque control mode (e.g., torque converter impeller torque is controlled to a desired torque while torque converter impeller speed is allowed to vary) when the trace is at a lower level. The horizontal axis represents time and time increases from the left side of the plot to the right side of the plot.

At time T0, the battery SOC is at a middle level and the driveline is not operating in a torque converter impeller speed control mode. The motor may be providing or absorbing torque from the driveline. The engine is operating in a driver demand mode where engine torque is based on or a function of driver demand torque. Driver demand torque may be based on accelerator pedal position and vehicle speed. The driveline is operating in a torque control mode as indicated by the torque converter impeller mode being at a lower level. The driveline may be in a torque control mode when the driver applies the accelerator pedal and the vehicle is traveling down a road.

At time T1, the battery SOC remains at a middle level, but the motor enters PI mode and the engine remains in driver demand control mode. The motor enters PI control mode to provide up to maximum positive and negative torque to the driveline to control torque converter impeller speed (e.g., full range of motor torque at the present motor speed). The engine remains in DD mode. The motor and engine modes are based on the battery SOC and the driveline entering a torque converter impeller speed control mode. The driveline may enter a torque converter impeller speed control mode during driveline creep conditions, while the transmission is in neutral or park, or during other conditions where it may be desirable to follow a desired torque converter impeller speed profile. The driveline is in a torque converter impeller speed control mode as indicated by the trace in the fourth plot from the top of FIG. 5 being at a higher level. The driveline or torque converter impeller speed may be well regulated in this mode because of the motor's high torque bandwidth and large torque range.

At time T2, driveline exits torque converter impeller speed control mode as indicated by the trace in the fourth plot from the top of FIG. 5 transitioning to a lower level. The driveline may exit torque converter impeller speed control in response to a drive applying an accelerator. The battery SOC remains at a middle level and the motor transitions out of torque converter speed control. The engine remains in driver demand torque control mode.

Between time T2 and time T3, the driveline may continue to operate in a torque control mode where the battery is charged and driver demand torque is followed. The time duration between time T2 and time T3 may be long or short.

At time T3, the driveline enters torque converter impeller speed control mode. The driveline may enter torque converter impeller speed control mode in response to a change in driver demand torque (not shown). The battery SOC is at a level higher than 502 so the motor enters IN mode and the engine enters PI mode. By entering IN mode, the motor torque output range is reduced (e.g., the motor torque range is constrained to ±20 Nm based on motor and driveline disconnect clutch inertia) so that the motor may provide and absorb less than maximum positive and negative torque at the present motor speed. The driveline speed may be less well regulated in this mode because the motor torque range is smaller as compared to when the motor is operating in PI mode, but the possibility of battery degradation may be reduced. The motor uses battery charge between time T3 and time T4.

At time T4, the battery SOC falls to a value less than 502. Consequently, the motor changes from IN mode to PI mode where the motor's torque range is increased (e.g., the motor torque range is increased to ±80 Nm) to improve torque converter impeller speed control. The engine operating mode also transitions to put the engine into DD mode where engine torque is based on driver demand torque. The driveline remains in torque converter impeller speed control mode.

At time T5, the driveline exits torque converter impeller speed control mode and enters driveline torque converter impeller torque control mode. The driveline may switch modes in response to a change in driver demand (not shown). The motor exits PI mode and the engine remains in DD mode in response to the driveline changing modes. The battery SOC remains below threshold 502.

Between time T5 and time T6, the driveline may continue to operate in a torque control mode where the battery is charged and driver demand torque is followed. The time duration between time T5 and time T6 may be long or short.

At time T6, the driveline enters torque converter impeller speed control mode. The driveline may enter torque converter impeller speed control mode in response to a change in driver demand torque (not shown). The battery SOC is at a level higher than 502 so the motor enters IN mode and the engine enters PI mode. By entering IN mode, the motor torque output range is reduced (e.g., the motor torque range is constrained to ±20 Nm) so that the motor may provide and absorb less than maximum positive and negative torque at the present motor speed. The driveline speed may be less well regulated in this mode because the motor torque range is smaller as compared to when the motor is operating in PI mode, but the possibility of battery degradation may be reduced.

At time T7, the driveline exits torque converter impeller speed control mode and enters driveline torque converter impeller torque control mode. The driveline may switch modes in response to a change in driver demand (not shown). The motor exits PI mode and the engine remains in DD mode in response to the driveline changing modes. The battery SOC remains below threshold 502.

Thus, the motor and engine operating modes may change in response to battery SOC when the driveline is operating in a torque converter impeller speed control mode. If the battery may accept a higher rate of charge or if battery SOC is lower than a threshold SOC, the motor may operate with its full range of torque (e.g., maximum positive and negative torque output at the present motor speed). On the other hand, if the battery may not accept a higher rate of charge or if battery SOC is greater than a threshold SOC, the motor may operate with less than its full range of torque (e.g., 10% of maximum positive and negative torque output at the present motor speed).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
in response to a battery state of charge lower than a threshold charge, operating a driveline in a first mode in which a motor in the driveline coupled between an engine and an impeller of a torque converter is operated at a first desired motor torque determined as a function of a desired torque converter impeller speed, and the engine is operated at a first desired engine torque determined as a function of a driver demand torque; and
in response to the battery state of charge higher than the threshold charge, operating the driveline in a second mode in which the engine in the driveline is operated at a second desired engine torque determined as a function of the desired torque converter impeller speed.

2. The method of claim 1, where, in the second mode, the motor is operated at a second desired motor torque determined as a function of each and every one of a torque converter impeller angular acceleration, a driveline disconnect inertia, and a motor inertia.

3. The method of claim 2, where, in the first mode, the first desired engine torque is piecewise linear with respect to the driver demand torque.

4. The method of claim 1, further comprising starting the engine if the engine is stopped when the driveline enters the second mode.

5. A driveline, comprising:
an engine;
a motor coupled to the engine via a disconnect clutch;
a torque converter comprising a turbine and an impeller, the impeller directly coupled to the motor via a shaft;
a battery electrically coupled to the motor;
a transmission coupled to the torque converter; and
a controller including executable instructions stored in non-transitory memory for operating the driveline in a first driveline speed control mode in which the engine is operated at a first desired engine torque determined as a function of a driver demand torque, and a second driveline speed control mode in which the engine is operated at a second desired engine torque determined as a function of a desired torque converter impeller speed, and instructions for switching from the first driveline speed control mode to the second driveline speed control mode in response to charge of the battery exceeding a threshold charge.

6. The driveline of claim 5, where, in the first driveline speed control mode, torque of the motor in the driveline is adjusted responsive to torque converter impeller speed.

7. The driveline of claim 5, where, in the second driveline speed control mode, the motor is operated at a second desired motor torque determined as a function of each and every one of a torque converter impeller angular acceleration, a driveline disconnect inertia, and a motor inertia.

8. The driveline of claim 5, where the first driveline speed control mode or the second driveline speed control mode is invoked when the transmission is in park or neutral.

9. The method of claim 1, wherein, in the second mode, the second desired engine torque is as a function of a difference between the desired torque converter impeller speed and an actual torque converter impeller speed.

10. The method of claim 1, where, in the second mode, the motor is operated at a second desired motor torque determined based on a driveline inertia.

11. The driveline of claim 5, where, in the second driveline speed control mode, the motor is operated at a second desired motor torque determined based on a driveline inertia.

12. A driveline operating method, comprising:
in response to a battery state of charge lower than a threshold charge, operating a driveline in a first mode in which a motor in the driveline coupled between an engine and an impeller of a torque converter is operated at a first desired motor torque determined as a function of a desired torque converter impeller speed, and the engine is operated at a first desired engine torque determined as a function of a driver demand torque; and
in response to the battery state of charge higher than the threshold charge, operating the driveline in a second mode in which the engine in the driveline is operated at a second desired engine torque determined as a function of the desired torque converter impeller speed, and reducing a torque output range of authority of the motor to a non-zero value.

13. The method of claim 12, where the torque output range of authority is reduced from a range extending from a maximum positive motor torque to a maximum negative motor torque.

14. The method of claim 12, where the torque output range of authority is based on driveline disconnect clutch inertia and motor inertia.

15. The method of claim 14, where the torque output range of authority is further based on driveline angular acceleration.

* * * * *